Feb. 20, 1940. H. NERWIN 2,190,729
PHOTOGRAPHIC CAMERA
Filed May 29, 1936
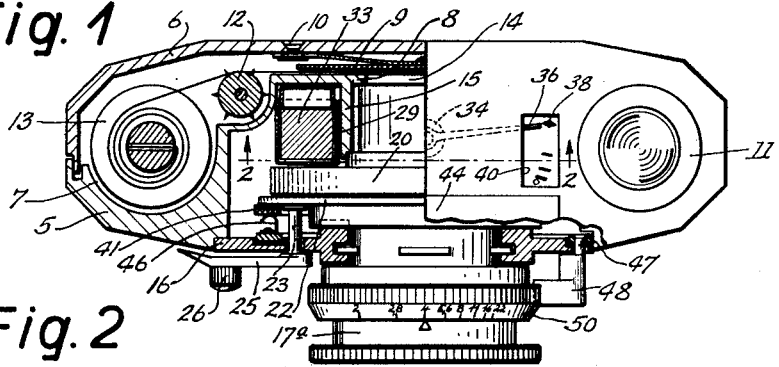
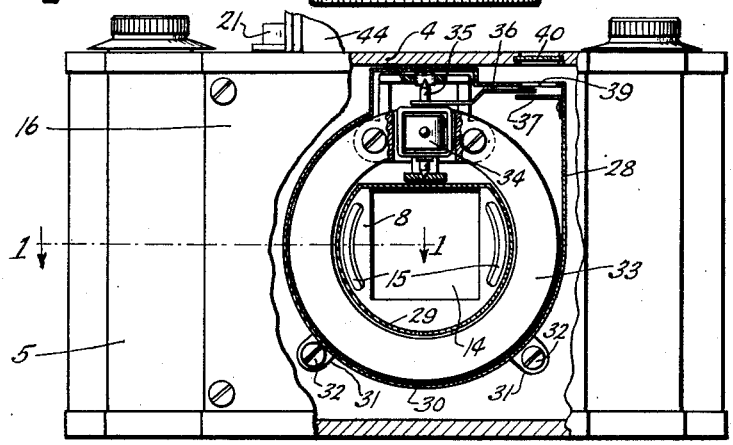
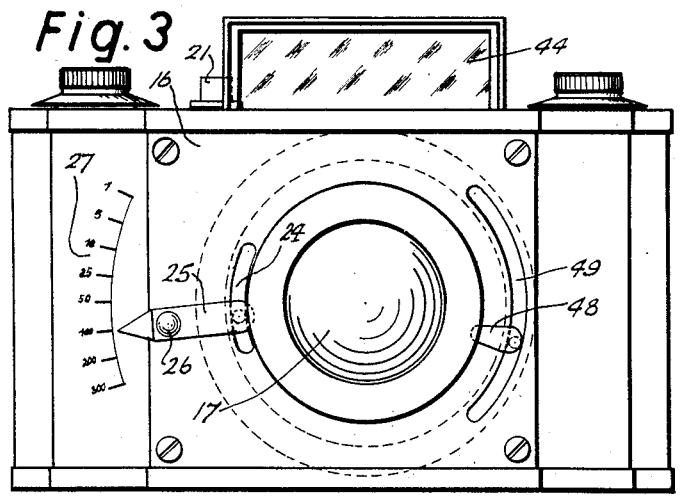
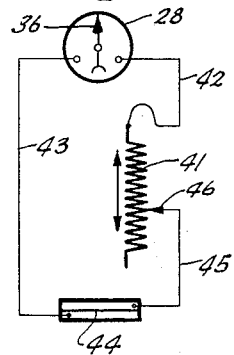
Inventor:
Hubert Nerwin
by B. Singer Atty.

Patented Feb. 20, 1940

2,190,729

UNITED STATES PATENT OFFICE 2,190,729

PHOTOGRAPHIC CAMERA

Hübert Nerwin, Dresden, Germany, assignor to Zeiss Ikon Aktiengesellschaft, Dresden, Germany Application May 29, 1936, Serial No. 82,488
In Germany June 15, 1935

15 Claims. (Cl. 95—10)

The invention relates to improvements in photographic cameras and particularly pertains to rollfilm cameras provided with a built-in photo electric exposure meter.

It is an object of the invention to arrange the measuring instrument, which forms a part of the photo electric exposure meter, in a space of the camera which ordinarily is not used at all, but is considered useless. By utilising this ordinarily vacant space for the measuring instrument it is not necessary to increase the size of the camera casing.

Another object of the invention is to position the measuring instrument of the photo electric exposure meter in the ordinarily vacant space which surrounds the beam of light between the lens shutter and the plane in which the light sensitive layer is arranged. For this purpose a measuring instrument of an annular shape or in the shape of a horseshoe is employed.

It is also an object of the invention to position the scale of the measuring instrument in such a way that it can be read by looking through a window in the top wall of the camera casing.

Still another object of the invention is to provide the measuring instrument of the exposure meter with a pointer mounted on a rotatable shaft which in the operative position of the camera assumes a vertical position.

With these and other objects in view, which will appear as the description proceeds, the invention consists in the novel features of construction, combination of elements and arrangement of parts as hereinafter more fully described.

In the accompanying drawing:

Fig. 1 is a top view of a rollfilm camera with the casing partially in section on the line I—I of Fig. 2 to illustrate the position of the field magnet of the measuring instrument.

Fig. 2 is a front elevation view of the rollfilm camera, with a portion of the front wall and the lens system removed and partly in section on line II—II of Fig. 1 to illustrate the position of the measuring instrument and its associated field magnet.

Fig. 3 is a front elevation view of the rollfilm camera, and

Fig. 4 is a wiring diagram of the photo electric exposure meter.

As shown in Fig. 1 the camera casing consists of two separable sections 5 and 6 of which the latter forms a rear cover adapted to permit access to the interior of the front section 5 for the insertion and removal of the rollfilm. The front section 5 is provided at each end with a semi-cylindrical recess 7 for receiving the customary film supply and take-up spools respectively. In the present instance the front section 5 is integrally formed with a film supporting wall 8 located substantially in the image plane and against which the film is pressed by a backing plate 9 yieldingly attached at 10 to the inner wall of the rear cover section 6. The film which is taken from the supply spool indicated at 11 is moved over the film supporting wall 8, and passes over a sprocket roller 12 before being wound upon the take-up spool 13.

The film supporting wall 8 is provided with a rectangular image opening 14 and on its side facing the front wall 16 of the front section 5 are arranged two forwardly projecting flanges 15. These flanges 15 may be curved concentrically about the optical axis of the lens system 17 which is arranged in a mounting 17a detachably secured to the front wall 16.

According to Fig. 1 the shutter device 20 is arranged in the front section 5 of the camera casing between the front ends of the flanges 15 and the front wall 16 which supports the lens system 17.

The shutter device 20 is actuated by a push button 21 projecting from the top wall 4 of the camera casing. The adjustment of the shutter device 20 for the various exposure times is effected by rotating a ring 22 which is rotatably mounted on the shutter device and has attached thereto an outwardly projecting stud 23, passing through slot 24 in the front wall 16 of the camera casing and carrying a pointer 25 with an actuating knob 26 thereon. This pointer 25 is adapted to be set manually opposite any scale division of an exposure time scale 27 which in the present instance is arranged on a front wall portion of the camera casing. The shutter device and its setting and operating mechanism are shown by way of example only and do not form, as such, a part of the present invention.

The measuring instrument of the photo electric exposure meter is arranged in the form of a self-contained structure in a space which normally remains vacant in the ordinary cameras. It will be noted from Figs. 1 and 2, that the measuring instrument is provided with a casing 28 of substantially annular shape whose axis is coaxial with the optical axis of the lens system. The inner nearly circular wall 29 of the casing 28 surrounds the flanges 15 which project forwardly from the film supporting wall 8. The outer substantially circular wall 30 of the casing 28 is provided with lugs 31 through which screws 32 pass which secure the casing and therewith the entire measuring instrument as a unit in the front section 5 of the camera casing. In the annular portion of the casing 28 is positioned the approximately annular field magnet 33 which is open at its upper portion to receive between its ends the armature 34 which is secured to a vertically arranged rotatable shaft 35 which also has secured thereto the pointer 36. According to Fig. 2 the casing 28 is provided at its upper right hand portion with an extension in which is arranged the scale 37 provided with a mark 38 opposite which the pointer 36 is to come to rest during the adjustment of the exposure meter. In a horizontal wall portion of the casing 28 and directly above the scale 37 is arranged an opening 39 which lies directly below a window 40 in the top wall of the camera casing and through which the measuring instrument may be read.

The exposure meter is provided with a variable resistance 41 which is mounted on the rotatable ring 22 of the shutter device 20. One end of the resistance 41, according to Fig. 4 is connected by a flexible conductor 42 with one terminal of the measuring instrument. Another conductor 43 leads from the other terminal of the measuring instrument to one electrode of the photo electric cell 44 whose other electrode is connected by a conductor 45 with a resilient contact member 46 which slidably engages the resistance 41. The contact member 46 is mounted on a ring 47 which is rotatably disposed on the inner face of the front wall 16 of the camera casing and coaxial with the optical axis of the lens system 17. This ring 47 is provided with an outwardly extending bracket 48 which passes through a curved slot 49 in the front wall 16 of the camera casing and is adapted to be coupled with the diaphragm adjusting ring 50 of the lens system 17.

The photo electric cell is mounted in any desired manner upon the narrow top wall 4 of the camera casing so that in its operative position it faces the object to be photographed.

The operation of the camera, as far as the adjustment of the same with the assistance of the exposure meter is concerned is as follows:

If it is desired to take a photograph with a certain exposure time, for instance 1/25 of a second, the shutter adjusting pointer 25 is set opposite the respective scale division of scale 27 and then, while pointing the lens system toward the scene to be photographed, the diaphragm adjusting ring 50 is rotated until the pointer 36 of the measuring instrument is brought opposite the mark 38, which indicates that the diaphragm has been adjusted to the correct opening for the prevailing light condition and the desired exposure time. During the adjustment of the shutter, the resistance 41 is rotated because it is mounted on the shutter adjusting ring 22 and during the adjustment of the diaphragm the contact member 46 is rotated and moved along the resistance 41 to vary the amount of resistance in the circuit of the exposure meter, while the photo electric cell due to the light falling upon it, is energized to supply the electric current for operating the measuring instrument.

It is, however, also possible to select first a certain diaphragm opening for the scene to be photographed and then adjust the shutter for the respective exposure time. This is done by adjusting first the diaphragm adjusting ring 50 and then moving the pointer 25 of the shutter adjusting device until the pointer 36 of the measuring device comes to rest opposite the mark 38.

What I claim as my invention is:

1. In a photographic camera, the combination of a photo electric exposure meter, a camera casing having a front wall and a rear wall fixedly spaced from each other, a camera objective mounting on said front wall and a measuring instrument forming a part of said photo electric exposure meter, said measuring instrument being arranged within said camera casing and including an open annular field magnet arranged between said front and rear wall coaxially with said camera objective mounting and in rear thereof.

2. In a photographic camera, the combination of a photo electric exposure meter, a camera casing having a front wall and a rear wall fixedly spaced from each other, a lens system on said front wall, means for supporting a light sensitive layer in the focal plane of said lens system, a shutter within said casing and a measuring instrument forming a part of said electric exposure meter, said measuring instrument being arranged between said supporting means and said shutter and including an open annular magnet arranged coaxially with the optical axis of said lens system.

3. In a photographic camera, the combination of a photo electric exposure meter, a camera casing having a front wall and a rear wall fixedly spaced from each other, a camera objective mounting on said front wall and a measuring instrument forming a part of said photo electric exposure meter, said measuring instrument being provided with an open annular magnet mounted fixedly within said camera casing between said front and rear wall coaxially with said camera objective mounting and in rear thereof and a movable coil with a pointer rotatable about an axis extending at a right angle to the axis of said lens mounting.

4. In a photographic camera, the combination of a photo electric exposure meter, a camera casing having a top wall provided with a window, a camera objective mounting and a measuring instrument forming a part of said photo electric exposure meter, said measuring instrument being arranged within said camera casing and being provided with an open annular magnet arranged coaxially with said camera objective mounting and having a movable coil with a pointer rotatable about an axis which extends vertically with respect to said top wall, said pointer being visible from the outside of said camera casing through said window in said top wall.

5. In a photographic camera, the combination of a photo electric exposure meter, a camera casing having a front wall and a rear wall fixedly spaced from each other, a lens system detachably mounted on said front wall, means for supporting a light sensitive layer in the focal plane of said lens system, a shutter within said casing directly behind the front wall of the same, and a measuring instrument forming a part of said electric exposure meter, said measuring instrument being arranged between said supporting means and said shutter and being provided with an open annular magnet arranged coaxially with the optical axis of said lens system, said measuring instrument having a pointer rotatable about an axis which in the operative position of the camera extends vertically and at a right angle to the optical axis of said lens system.

6. In a photographic camera, the combination of a photo electric exposure meter, a camera casing having a top wall, a lens system, means in said casing for supporting a light sensitive layer in the focal plane of said lens system, a shutter within said casing, means for actuating said shutter from the outside of said casing, a measuring instrument forming a part of said exposure meter, said measuring instrument being arranged between said supporting means and said shutter and being provided with an open annular magnet arranged coaxially with the optical axis of said lens system, said measuring instrument being also provided with a coil and a pointer both attached to a rotatable vertical shaft, and means in said top wall of said camera casing for rendering said pointer visible from the outside of said camera casing.

7. In a photographic camera, the combination of a photo electric exposure meter, a camera casing having a top wall and a front wall, a camera objective mounted on said front wall, said photo electric exposure meter being provided with a measuring instrument arranged within said camera casing, said measuring instrument being provided with an open annular magnet arranged coaxially with said camera objective and also having a pointer rotatable about a vertical axis, and means in the top wall of said camera casing for rendering said pointer visible from the outside of said camera casing.

8. A photographic camera as set forth in claim 7, in which said measuring instrument is provided with a substantially annular casing which is arranged concentrically with respect to the optical axis of said camera objective.

9. A photographic camera as set forth in claim 7, in which said camera casing is provided with means for supporting a light sensitive layer in the focal plane of said camera objective, and in which said measuring instrument is provided with a substantially annular casing which is arranged concentrically with respect to the optical axis of the camera objective and between said camera objective and said supporting means.

10. In a photographic camera, the combination of a photo electric exposure meter, a camera casing having a top wall, a rear wall and a front wall rigidly connected with each other, a lens system mounted on said front wall, means within said casing for supporting a light sensitive layer, said photo electric exposure meter being provided with a measuring instrument comprising a self-contained structure including a substantially annular casing arranged concentrically with respect to the optical axis of said lens system and a pointer rotatable about an axis which extends vertically with respect to the top wall of said camera casing, said measuring instrument being arranged within said camera casing between said front wall and said light sensitive layer supporting means, and means in the top wall of said camera casing for rendering said pointer visible from the outside of said camera casing.

11. In a photographic camera, the combination of a photo electric exposure meter, a camera casing having a front wall and a rear wall rigidly connected with each other by a top wall and a bottom wall, a lens system mounted on said front wall, means for supporting a light sensitive layer in the focal plane of said lens system, a shutter within said casing, and a measuring instrument forming a part of said photo electric exposure meter, said measuring instrument being arranged between said supporting means and said shutter and being provided with a permanent magnet extending around the beam of light passing through said lens system.

12. In a photographic camera, the combination of a photo electric exposure meter, a camera casing having a front wall and a rear wall rigidly connected with each other by a top wall and a bottom wall, a camera objective mounting on said front wall, and a measuring instrument forming a part of said photo electric exposure meter, said measuring instrument being arranged within said camera casing and including an annular magnet arranged between said front and rear wall coaxial with said camera objective mounting and in rear thereof, a movable coil between the poles of said magnet, and a pointer.

13. In a photographic camera, the combination of a photo electric exposure meter, a camera casing having a front wall and a rear wall rigidly connected with each other by a top wall and a bottom wall, a lens system mounted on said front wall, means for supporting a light sensitive layer in the focal plane of said lens system, a shutter within said casing, and a measuring instrument forming a part of said photo electric exposure meter, said measuring instrument being arranged between said supporting means and said shutter and consisting of an annular magnet, a movable coil between the poles of said magnet, and a pointer, said annular magnet being arranged coaxially with the optical axis of said lens system.

14. In a photographic camera, the combination of a photo electric exposure meter, a rigid camera casing having a front wall and spaced therefrom and parallel thereto a film supporting wall provided with a picture opening, a camera objective mounted on said front wall, and a measuring instrument forming a portion of said exposure meter, said measuring instrument being mounted within said camera casing between said front wall and said film supporting wall and in the ordinary vacant space surrounding the beam of light passing through said camera objective, said measuring instrument being accessible for observation from the outside of the camera casing.

15. In a photographic camera, the combination of a photo electric exposure meter, a rigid camera casing having a top wall, a front wall and a film supporting wall provided with a picture opening spaced from and parallel to said front wall, a camera objective mounted on said front wall, a measuring instrument forming a portion of said exposure meter, said measuring instrument being mounted within said camera casing between said front wall and said film supporting wall and in the ordinary vacant space surrounding the beam of light passing through said camera objective, said top wall being provided with a window for observing said measuring instrument.

HUBERT NERWIN.